Sept. 6, 1966   C. M. SCHOTT, JR   3,271,560
DIE
Filed Nov. 29, 1963
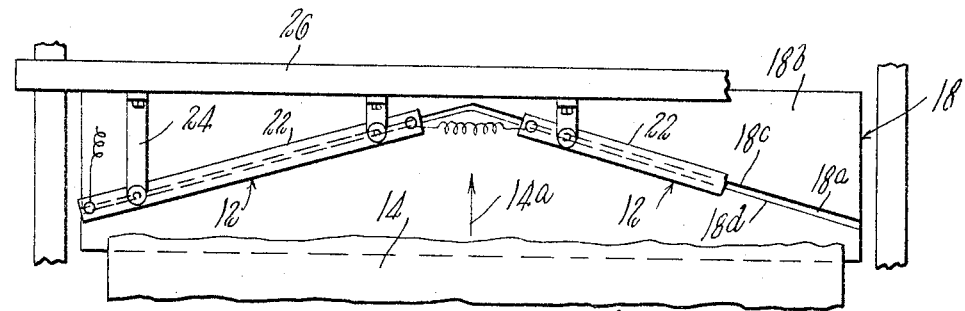
Fig. 1.
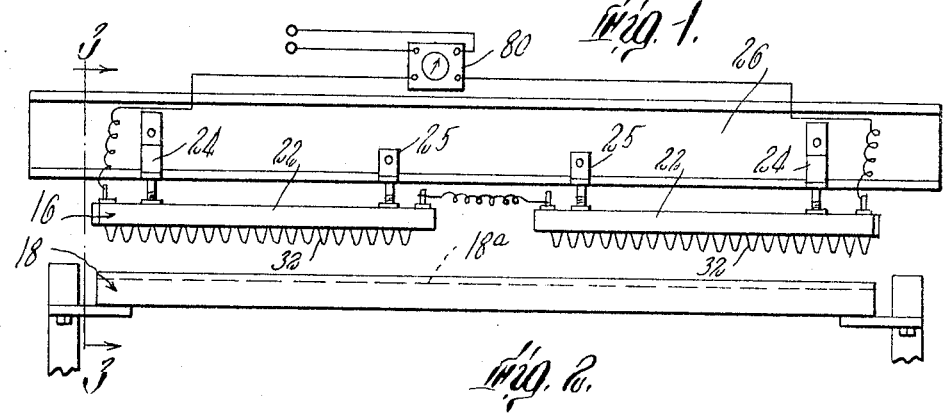
Fig. 2.
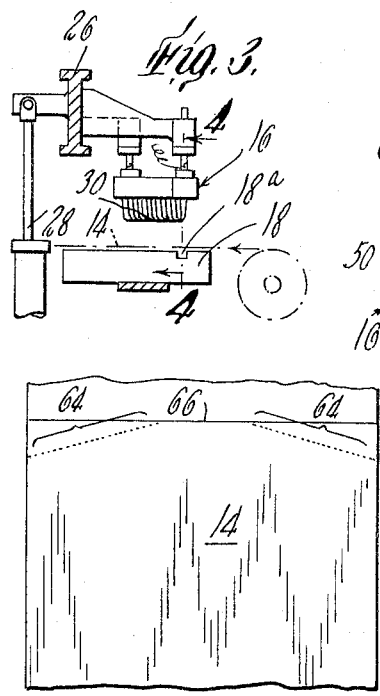
Fig. 3.
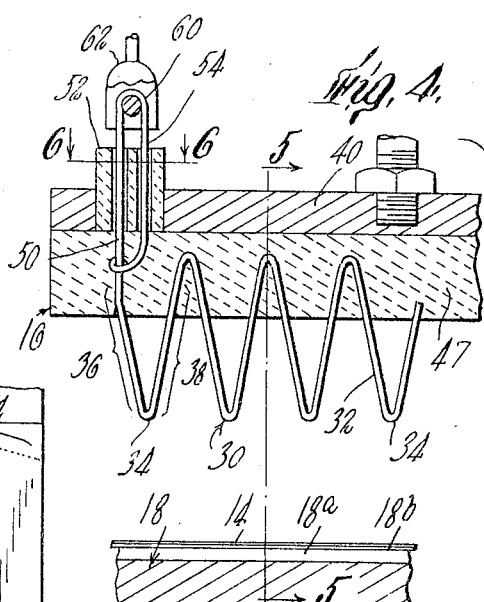
Fig. 4.
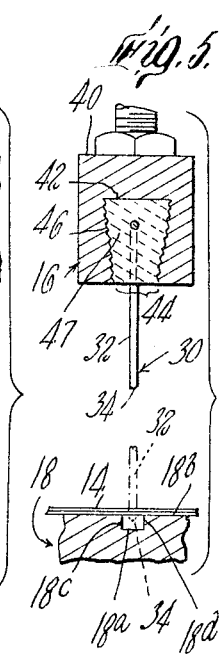
Fig. 5.
Fig. 7.
Fig. 6.

United States Patent Office 3,271,560
Patented Sept. 6, 1966

3,271,560
DIE
Charles M. Schott, Jr., Gloucester, Mass., assignor, by mesne assignments, to The First National Bank of Boston
Filed Nov. 29, 1963, Ser. No. 326,755
6 Claims. (Cl. 219—243)

This invention relates to die members for deforming plastic film by the technique in which heated die projections are thrust through the film and form holes. Such technique is widely used in making plastic garment bags in which superposed layers of plastic film are joined together by the beads of plastic that surround the holes.

Heretofore, in the prior art, die projections in the form of points have been formed by a heat-conductive metal member, e.g. by machining a metal bar, and an electric cartridge heater, tubular heater or strip heater has been inserted in a bore in the bar, or otherwise placed in a heat-conductive relation to the bar, to heat said bar and thereby said points. Such prior art devices have presented a number of problems. One of the major problems is that the plastic tends to agglomerate on the points of the metal bar in the form of sticky "fish eyes" because the points are not heated sufficiently, requiring the machine to be shut down. This can hardly be tolerated in an in-line machine in which the plastic film flows continually from extrusion to the hole-making die, and in other machines it is an aggravating and costly inconvenience. On the other hand, to produce enough heat at the points, e.g. 900° F.–1,000° F., for polyethylene, the heater must be heated much higher than that temperature, e.g. as high as 2,000° F., and experience has proven that at such temperatures the heaters have short life, as well as high power loss. Other difficulties with the prior art devices include the substantial expense involved in machining the points, the impracticality of forming the lines of projections in curved or other special forms, or in forming the individual holes in special forms, to meet the needs of special customers, and the insufficient range of adjustment and slow response of the temperature of the projections to accommodate the various types of plastics available.

It is a principal object of the present invention, therefore, to provide a new type of die whereby these objections are overcome.

Another object of the invention is to provide a self-cleaning long-life die of simple construction that is practical and inexpensive to manufacture and operate.

In the drawings:

FIG. 1 is a plan view of the preferred die arrangement of the invention, shown being employed in a bag making machine;

FIG. 2 is a side view of the die arrangement of FIG. 1;

FIG. 3 is a vertical cross-sectional view taken on line 3—3 of FIG. 2;

FIG. 4 is a vertical cross-sectional view of substantially enlarged scale, taken on line 4—4 of FIG. 3, showing in detail the preferred construction of the heated projections;

FIG. 5 is a vertical cross-sectional view taken on line 5—5 of FIG. 4;

FIG. 6 is a horizontal cross-sectional view of the electrical connection taken on line 6—6 of FIG. 4; and FIG. 7 is a plan view of a bag formed by the machine.

One of the important aspects of the invention is the realization that a thin resistance wire bent or stamped to form a projection can be employed as a male member in a hole-making die for plastic, and can be constructed and arranged so it will not distort. Another aspect is that a plurality of such projections, arranged electrically in series, preferably as integral portions of a single wire of conventional material, can produce a highly electrically efficient die that can perform its dieing function at temperatures so much lower than the wire rating that its life is virtually indefinite.

One further aspect of the invention is the fact that in making a garment bag machine a thin, and, therefore, relatively high resistance wire can form the die projections, and that the length employed can produce a single element that, without waste of heat, will have a small current carrying cross-section and a substantial length, hence a high resistance so that the cost of transforming from 110 volt A.C. power is practical.

With regard to the preferred embodiment, the plan view of FIG. 1 shows two die devices 12 disposed across superposed layers of plastic film 14. The film is alternately moved in the direction of the arrow 14a, and stopped relative to the dies. While the dies of this invention can be used with continuous and intermittent machines of all varieties, it is patricularly useful in in-line bag machines such as described in my copending application, Serial No. 351,327.

Referring also to FIG. 2 each of the die devices comprises an upper die member 16 and a lower die member 18 between which the plastic film is drawn.

The bottom die 18 is stationary, mounted on brackets below the path of the film, and the upper die 16 is mounted by bar members 22 and brackets 24, 25 to a vertically reciprocating beam 26, which is moved up and down, e.g. by pistons 28 (FIG. 3), through a travel, e.g., of ½ inch.

The bottom die 18 comprises an elongated groove 18a disposed in a flat supporting surface 18b, the groove having two straight edges 18c and 18d parallel to the upper die now to be described.

Referring to FIGS. 4 and 5, the upper die presents a series of spaced-apart projections 30, directed downwardly in alignment with the groove 18a in the lower die 18, and exposed to engage the film. These projections are defined by an electrical resistance wire 32, preferably bent into a multiple zig-zag form as shown, the tip 34 of each projection being formed by the angular intersection of adjacent integral portions 36 and 38 of the wire. A support means is arranged to engage these portions above their angular intersections, to support the sides of the wire against collapse and to position the projections in the desired arrangement. In the preferred embodiment the support means takes the form of a rigid member 40 having a channel 42 formed therein, the upper parts of the wire being disposed in this channel. Advantageously, the channel is of wedge-shaped vertical cross-section (FIG. 5) with the lower width 44 smaller than the upper width and the walls 46 are roughened, e.g., during machining by employing a very coarse feed for the shaper that forms the channel. With the upper parts of the wire freely disposed in the channel 42 a heat-resistant ceramic cement 47 is cast rigidly therein, the shape of the channel 42 locking the cement in, when hard, and the cement engaging the wire and securing it to the rigid member. As an example, the cement can be a well-known Sauereisen aluminum oxide cement, made by the Sauereisen Cements Company of Pittsburgh, Pennsylvania. The cement performs a number of important functions. It is a simple way of locking the projections in the desired arrangement, whatever that arrangement may be, it offers intimate support to the wire portions, so crucial due to the exposure of the outer ends, and it insulates the nonoperative upper ends from heat loss.

At each end of the rigid member 40 a vertical opening 48 is provided through which a portion 50 of the wire extends through a ceramic bushing 52 for the purpose of providing an electrical connection. Advantageously, the wire 50 is doubled back with portion 54 extending back through the bushing and electrically joined to wire 50 in the region of the cement 47. This not only provides a strengthened loop 60 to which an electrical connecting lug 62 can be joined, but also, the portions of the wire 50 and 54 serve as parallel connections for the power, so that the connections are not heated so much as the working portions of the wire.

The operation of the invention will now be described. In the inoperative position the two dies 16 and 18 are spaced apart and allow plastic film 14 to move therebetween. Then, when the film stops, piston 28 (FIG. 3) moves upper die 16 down to the position shown in dotted lines in FIG. 5, with the tips 34 of the wire projections penetrating the plastic 14 and entering slightly into the groove 18a in the lower die 18 while the support surfaces 18b of the lower die prevent the distortion of the film into the groove. Advantageously, the entire body of the wire is heated in the range of 900°–1,000° F., usually below the temperature at which it glows. As it penetrates the plastic, it forms corresponding holes therein and weld beads of plastic surrounding the holes, joining the superposed layers together, and when withdrawn any plastic adhering to the wires is burned off in a completely self-cleaning manner.

Referring to FIG. 7 with the use of the two dies as arranged in FIG. 1, two burn-through heat seal lines 64 are provided at angles across the width of the plastic 14, with an opening 66 between the seal lines, providing the form of the sloped shoulders of a garment bag.

Advantageously, for garment bags, the projections are formed of round cross-section wire of .040 inch diameter, the wire having the composition Ni 78; Cr 20; Mn 2 (max.); C 0.06, rated up to 2,100° F., and having a standard resistance of 0.4 ohm per foot. The over-all height of the zig-zag wire is 5/8 inch and the spacing between operative tips is 3/10 inch. Of the height, 1/4 inch is embedded in the cement and the die travel is adapted to carry the tips 1/8 inch through the film, into the groove 18a. Each of the dies has around 15 inches of effective length or 45 tips, the projections of each die 16 all arranged in series, and the two dies 16 arranged in series so that the total wire length is on the order of 110 inches or more. A voltage of around 60 volts is applied across this wire, by adjustable transformer 80, this voltage being readily variable to vary the temperature of the tips to match that needed for any paritcular material. One of the advantages of the invention is that the die wire itself has such a small cross-section, and long useful length that relatively small amount of transforming is required, so that the substantial expense involved in transformers for greater reduction is avoided.

Because the wire operates at a temperature far below its rating, and because it is self-cleaning and hence needs no scraping, the life expectancy of the die element under 24 hour-a-day continuous usage is equal to that of the rest of the machine. Of course, the possibility of misuse of the machine decreases the life expectancy as a practical matter, but, contrary to what a person might anticipate, these fragile-looking wire projections have already been experimentally used successfully in shops known for rough handling, with no occasion yet for replacement.

Advantageously, the bottom die need never apply any force to the wire, but rather there is only a relative sliding motion with clearance. Actually only one supporting surface and one straight edge is all that is needed, but two supporting surfaces with corresponding straight edges, is the preferred arrangement.

But it is possible for the wire to press against the bottom die, particularly if the latter is resilient, because the wire projections can be made to have a surprising amount of rigidity, due to the only slight extent they need to protrude from their mounting. While the cement mounting is very advantageous with regard to simplicity and durability, it is also possible to employ numerous mechanical clamping devices and still obtain some of the benefit of the invention. While round wire is presently preferred, and with the current passing, even through the outermost extremity of the tip, flat wire can also be employed, either bent or stamped, and the outer part of the projections may be heated principally by integral adjacent parts of the wire. Also, while it is desirable to have an integral wire throughout a substantial length, it is possible to even have each projection as a separate member though in series with other of the members. Much of the rigidity of the projections of the preferred embodiment is attributable to the fact that each has two supporting legs, but here again, some of the benefit of the invention can be enjoyed with only single legs, especially where some auxiliary support is offered.

From what has gone before it is obvious that the arrangement of projections need not be straight, but can be curved in any manner desired, or even staggered, and that the size of the holes formed by the wires depends upon the size of the wire and the size of the angular intersection. If larger holes are desired, it is possible to enlarge the tips of the projections, or even to form wire of larger diameter into a horizontally circular form to engage the film facewise, which would be an efficient way of forming large holes in plastic film to be used in agriculture. Indeed, the invention is useful on single thickness plastic film simply as a perforator, having the advantage of no parts that can become dull with use.

Another specific type of projection, according to the invention, is that formed by the continuous edge of a strip of wire. For instance, a strip wire of 1 inch width can be employed edgewise as a male die, the exposed margin of the strip could be 1/8 inch in width, of continuous material. The strip can be notched greatly, e.g., by cutting away squares of the material 7/8 inch x 7/8 inch, and leaving only 1/8 inch wide strips spaced 1 inch apart, joined integrally to the margin and extending at right angles thereto for a distance of 7/8 inch. The outer ends of these strips, e.g., for 1/2 their length or more, advantageously can be embedded in the cement according to the mode described above, to support the elongated edge against collapse, while allowing it to receive the compressional forces involved in hot dieing. By the cutaways the current-carrying cross-section is limited to the margin. For better support the right angled strips can widen toward their free ends, to increase support given by the cement without adversely affecting the electrical resistance of the margin. Such a die can be used for simultaneously forming the sides of two bags and in effect forming an elongated hole through the double layer of plastic, to cut the two bags apart by the burn-through technique.

These and other modifications are obviously within the skill of the art once the basic teaching of this invention is appreciated. It will, therefore, be understood that the invention is not limited to the specific embodiment shown and that various deviations may be made therefrom without departing from the spirit and scope of the appended claims.

I claim:

1. A die apparatus comprising first and second die members mounted to be moved together to form spaced-apart holes in plastic film, wherein the first of said die members comprises an elongated support surface terminating at an edge, for supporting the film, and the second die member comprises a thin, elongated, electric resistance means, the means shaped to define a multiplicity of spaced-apart columnar projections directed generally towards said other die member, said projections exposed to engage the film, every projection arranged in electrical series with a multiplicity of other ones, a support means engaging said shaped resistance means at a location spaced from the tips of said projections, reinforcing and positioning said tips in a predetermined free-standing with the face of plastic film arrangement, the opposite ends of said resistance means having electrical connections for passing electric current therethrough, and mounting means adapted to move said second member relative to the first to carry the tips of said projections, when heated, past, and close to the edge of said first member whereby, while said film is supported by said first member, said resistance-heated projections form a corresponding arrangement of holes in said plastic film.

2. The apparatus of claim 1 wherein said elongated electric resistance means comprises a wire means, said wire means being bent into a multiple zig-zag form, the tip of each of said spaced-apart projections being formed by the angular intersection of adjacent integral portions of said wire, and said support means engaging each of said portions spaced from its angular intersection, and supporting the sides of said wire against collapse.

3. The die apparatus of claim 2 wherein said support means comprises a rigid member having a channel formed therein, the portions of said wire spaced from said intersections being disposed in the channel of said member, and a rigid heat-resistant cement cast in said channel engaging said wire and means retaining said cement in said channel.

4. The apparatus of claim 2 wherein said first die member comprises first and second supporting surfaces and a groove formed therebetween, in alignment with said projections, said groove having a width greater than that of said projections, and said members being arranged so that said projections enter said groove without engaging either of said supporting surfaces or the walls forming said groove.

5. A die member for forming a hole in plastic, said die member comprising an elongated electric resistance wire having a portion formed into a projection shaped to operate as a male die member, said projection exposed to penetrate plastic film, means supporting and stiffening the wire at a point spaced from the plastic penetrating portion of said projection, means for passing an electric current through the body of said resistance wire, and means for reciprocably moving said projection to and through the face of a plastic film for burning a hole therethrough, said male die projection being supported against collapse by a plurality of integral, spaced-apart legs embedded in heat-resistant cement.

6. A die apparatus comprising first and second die members mounted to be moved together to form plastic film, wherein the first of said die members comprises an elongated support surface, for supporting the film, and the second die member comprises a thin, elongated, electric resistance means, the means shaped to define at least one free-standing columnar projection directed generally towards said other die member, said projection exposed for its tip to engage the face of said film, a support means engaging said shaped resistance means at a location spaced from the tip of said projection, reinforcing and positioning said projection in a predetermined arrangement to pierce said plastic film, the opposite ends of said resistance means having electrical connections for passing electric current therethrough, and mounting means adapted to move said second member relative to the first to carry the tip of said projections, when heated, at least close to said first member whereby, while said film is supported by said first member, said resistance-heated projection imparts a formation to said plastic film.

References Cited by the Examiner

UNITED STATES PATENTS

| | | | |
|---|---|---|---|
| 2,430,920 | 11/1947 | Dodge | 156—579 |
| 2,494,824 | 1/1950 | Martin | 219—233 |
| 2,550,836 | 5/1951 | MacHenry | 83—171 |
| 2,701,835 | 2/1955 | Anton | 219—235 X |
| 2,961,031 | 11/1960 | Fener | 156—515 |
| 2,967,224 | 1/1961 | Irwin | 317—98 |
| 3,010,005 | 11/1961 | Sjostrom | 156—515 |
| 3,015,601 | 1/1962 | Fener | 156—515 |
| 3,115,564 | 12/1963 | Stacy | 156—515 X |

RICHARD M. WOOD, *Primary Examiner.*

C. L. ALBRITTON, *Assistant Examiner.*

UNITED STATES PATENT OFFICE
CERTIFICATE OF CORRECTION

Patent No. 3,271,560                                  September 6, 1966

Charles M. Schott, Jr.

It is hereby certified that error appears in the above numbered patent requiring correction and that the said Letters Patent should read as corrected below.

Column 4, line 72, after "free-standing" insert -- arrangement for endwise engagement --; line 73, strike out "arrangement".

Signed and sealed this 29th day of August 1967.

(SEAL)
Attest:

ERNEST W. SWIDER                             EDWARD J. BRENNER
Attesting Officer                                   Commissioner of Patents